(12) United States Patent
Banker et al.

(10) Patent No.: US 7,794,559 B2
(45) Date of Patent: Sep. 14, 2010

(54) FORMING FASTENING PROJECTIONS ON RIGID SUBSTRATES

(75) Inventors: Shawn C. Banker, Lee, NH (US); Ernesto S. Tachauer, Center, IA (US); William P. Clune, Hillsborough, NH (US)

(73) Assignee: Velcro Industries B.V., Curacao (AN)

( * ) Notice: Subject to any disclaimer, the term of this patent is extended or adjusted under 35 U.S.C. 154(b) by 356 days.

(21) Appl. No.: 11/748,427

(22) Filed: May 14, 2007

(65) Prior Publication Data
US 2007/0264482 A1 Nov. 15, 2007

Related U.S. Application Data

(60) Continuation-in-part of application No. 11/082,384, filed on Mar. 17, 2005, now abandoned, which is a continuation-in-part of application No. 11/005,185, filed on Dec. 6, 2004, now Pat. No. 7,727,440, which is a division of application No. 10/163,169, filed on Jun. 4, 2002, now Pat. No. 6,991,843, which is a continuation-in-part of application No. 09/808,395, filed on Mar. 14, 2001, now Pat. No. 7,048,818.

(60) Provisional application No. 60/242,877, filed on Oct. 24, 2000, provisional application No. 60/189,125, filed on Mar. 14, 2000.

(51) Int. Cl.
*B32B 3/10* (2006.01)

(52) U.S. Cl. ............................ 156/245; 264/166
(58) Field of Classification Search ............... 264/481, 264/166; 156/245
See application file for complete search history.

(56) References Cited

U.S. PATENT DOCUMENTS

| 2,760,230 | A | | 8/1956 | Van Riper |
| 2,893,056 | A | | 7/1959 | Henning |
| 3,857,397 | A | | 12/1974 | Brosseau |
| 4,097,634 | A | * | 6/1978 | Bergh .......................... 428/156 |
| 4,164,008 | A | | 8/1979 | Miller et al. |
| 4,234,531 | A | | 11/1980 | Jocteur |
| 4,281,211 | A | | 7/1981 | Taturn |
| 4,285,648 | A | | 8/1981 | Jocteur |
| 4,468,435 | A | | 8/1984 | Shima et al. |
| 4,602,191 | A | | 7/1986 | Davila |
| 4,794,028 | A | | 12/1988 | Fischer |
| 4,863,541 | A | | 9/1989 | Katz et al. |
| 5,260,015 | A | | 11/1993 | Kennedy et al. |

(Continued)

FOREIGN PATENT DOCUMENTS

EP 0 813 277 12/1997

(Continued)

*Primary Examiner*—Joseph S. Del Sole
*Assistant Examiner*—Kimberly A Stewart
(74) *Attorney, Agent, or Firm*—Fish & Richardson P.C.

(57) ABSTRACT

Rigid substrates having molded fastener projections, and methods of making the same are disclosed. A substrate has a beam stiffness, measured as a product of an overall moment of inertia of a nominal transverse cross-section and an effective modulus of elasticity of a material from which the substrate is made, that is greater than about 200 lb-in$^2$ (0.574 N-m$^2$). In situ lamination of hook, bands or islands on surfaces of a rigid substrate held in a planar orientation or presenting a planar surface.

28 Claims, 9 Drawing Sheets

U.S. PATENT DOCUMENTS

| | | | |
|---|---|---|---|
| 5,310,964 A | | 5/1994 | Roberts et al. |
| 5,441,687 A | * | 8/1995 | Murasaki et al. ............ 264/167 |
| 5,455,749 A | | 10/1995 | Ferber |
| 5,499,912 A | * | 3/1996 | Mezei ......................... 425/363 |
| 5,518,795 A | * | 5/1996 | Kennedy et al. ............ 428/100 |
| 5,537,723 A | * | 7/1996 | Yoshida et al. ................ 24/452 |
| 5,569,549 A | | 10/1996 | Redford |
| 5,643,651 A | | 7/1997 | Murasaki |
| 5,669,120 A | * | 9/1997 | Wessels et al. ................ 24/446 |
| 5,716,574 A | | 2/1998 | Kawasaki |
| 5,763,112 A | | 6/1998 | Redford |
| 5,807,516 A | | 9/1998 | Wolstenholme et al. |
| 5,845,375 A | * | 12/1998 | Miller et al. .................. 24/452 |
| 5,938,997 A | | 8/1999 | Sakakibara et al. |
| 5,945,193 A | | 8/1999 | Pollard et al. |
| 5,948,337 A | | 9/1999 | Sakakibara et al. |
| 5,953,797 A | * | 9/1999 | Provost et al. ................ 24/452 |
| 6,036,259 A | | 3/2000 | Hertel et al. |
| 6,210,771 B1 | | 4/2001 | Post et al. |
| 6,280,670 B1 | * | 8/2001 | Buzzell et al. .............. 264/167 |
| 6,540,863 B2 | | 4/2003 | Kenney et al. |
| 6,604,264 B1 | | 8/2003 | Naohara et al. |
| 6,668,380 B2 | | 12/2003 | Marmaraopoulos et al. |
| 6,697,262 B2 | | 2/2004 | Adams et al. |
| 7,048,818 B2 | * | 5/2006 | Krantz et al. ................. 156/66 |
| 2002/0125605 A1 | | 9/2002 | Lacey et al. |
| 2004/0088835 A1 | | 5/2004 | Tachauer et al. |
| 2004/0131823 A1 | | 7/2004 | Rodgers et al. |
| 2004/0222551 A1 | | 11/2004 | Provost et al. |

FOREIGN PATENT DOCUMENTS

| | | |
|---|---|---|
| GB | 2 256 977 | 12/1992 |
| GB | 2 275 373 | 8/1994 |
| JP | 59196214 | 11/1984 |
| JP | 2000 333709 | 5/2000 |
| JP | 2001 291433 | 10/2003 |
| JP | 2003 299506 | 10/2003 |
| WO | WO2004/018796 | 3/2004 |
| WO | WO2005/090045 | 9/2005 |

* cited by examiner

FORMING FASTENING PROJECTIONS ON RIGID SUBSTRATES

CROSS-REFERENCE TO RELATED APPLICATIONS

This application is a continuation-in-part of U.S. Ser. No. 11/082,384, filed Mar. 17, 2005 now abandoned. This application is also a continuation-in-part of U.S. Ser. No. 11/005,185, filed Dec. 6, 2004 now U.S. Pat. No. 7,727,440; which is a divisional of Ser. No. 10/163,169 filed Jun. 4, 2002, now U.S. Pat. No. 6,991,843; which in turn is a continuation-in-part of U.S. Ser. No. 09/808,395, filed Mar. 14, 2001, now U.S. Pat. No. 7,048,818, which application claims the benefit of priority from the following U.S. Provisional Applications Ser. No. 60/242,877, filed Oct. 24, 2000 and 60/189,125, filed Mar. 14, 2000. The entire contents of each of the foregoing are hereby incorporated by reference.

TECHNICAL FIELD

This invention relates to rigid substrates having molded fastener projections, and methods of making the same.

BACKGROUND

Early male touch fastener products were generally woven materials, with hooks formed by cutting filament loops. More recently, arrays of smaller fastener elements have been formed by molding the fastener elements, or at least the stems of the elements, of resin, forming an interconnect sheet of material. Generally, molded plastic hook tape has displaced traditional woven fabric fasteners for many applications, primarily because of lower production costs.

Molded plastic hook tape is often attached to substrates by employing an adhesive, or by sewing when the substrate is a made from sewable material. Often, adhesive-backed hook tape is utilized to attach the hook tape at desired locations on the substrate. Unfortunately, the process of applying adhesive-backed hook tape can be slow, and adhesion of the adhesive-backed hook tape to the substrate can be poor.

SUMMARY

Generally, the invention relates to rigid substrates having molded fastener projections, e.g., hooks or stems from which fastener elements can be formed, and methods of making the same.

In one aspect, the invention features a method of molding projections on a substrate. The method includes introducing a substrate having an outer surface into a gap formed between a peripheral surface of a rotating mold roll that defines a plurality of discrete cavities that extend inwardly from the peripheral surface, and a supporting surface. Resin is delivered to a nip formed between the outer surface of the substrate and the peripheral surface of the rotating mold roll. The outer surface of the substrate and the peripheral surface of the rotating mold roll are arranged to generate sufficient pressure to at least partially fill the cavities in the mold roll as the substrate is moved through the gap to mold an array of discrete projections including stems that extend integrally from a layer of the resin bonded to the substrate. The molded projections are then withdrawn from their respective cavities by separation of the peripheral surface of the mold roll from the outer surface of the substrate by continued rotation of the mold roll. The substrate has a beam stiffness, measured as a product of an overall moment of inertia of a nominal transverse cross-section and an effective modulus of elasticity of a material from which the substrate is formed, that is greater than about 200 lb-in$^2$ (0.574 N-m$^2$).

In some embodiments, the beam stiffness is greater than 1,000 lb-in$^2$ (2.87 N-m$^2$), e.g., 4,000 lb-in$^2$ (11.48 N-m$^2$) or more, e.g., 8,000 lb-in$^2$ (22.96 N-m$^2$).

In some instances, the effective modulus of elasticity of the material from which the substrate is formed is greater than 100,000 psi (6.89×10$^8$ N/m$^2$), e.g., 250,000 psi (1.72×10$^9$ N/m$^2$), 750,000 psi (5.17×10$^9$ N/m$^2$), 1,000,000 psi (6.89×10$^9$ N/m$^2$) or more, e.g., 5,000,000 psi (3.45×10$^{10}$ N/m$^2$), 15,000,000 psi (1.03×10$^{11}$ N/m$^2$) or more, e.g., 30,000,000 psi (2.07×10$^{11}$ N/m$^2$).

In some implementations, the supporting surface is a peripheral surface of a counter-rotating pressure roll or a fixed pressure platen.

In some embodiments, the cavities of the mold roll are shaped to mold hooks so as to be engageable with loops. In other embodiments, the cavities of the mold roll are shaped to mold hooks, and the hooks are reformed after molding.

In some instances, each projection defines a tip portion, and the method further includes deforming the tip portion of a plurality of projections to form engaging heads shaped to be engageable with loops, or other projections, e.g., of a complementary substrate.

In some embodiments, the resin is delivered directly to the nip. In some implementations, the resin is delivered first to the outer surface of the substrate upstream of the nip, and then the resin is transferred to the nip, e.g., by rotation of the mold roll.

The substrates can have a variety of shapes, e.g., the substrate can have an "L" shape, "T" shape or "U" shape in transverse cross-section.

In some embodiments, the method further includes introducing another resin beneath the resin such that the other resin becomes bonded to the outer surface of the substrate and the resin becomes bonded to an outer surface of the other resin.

The substrate can have, e.g., an average surface roughness of greater than 1 micron, e.g., 2 micron, 4 micron, 8 micron, 12 micron or more, e.g., 25 micron.

In some implementations, the substrate is formed from more than a single material.

In some instances, the projections have a density of greater than 300 projections/in$^2$ (46.5 projections/cm$^2$).

In some embodiments, the method further comprises preheating the substrate prior to introducing the substrate into the gap, or priming the substrate prior to introducing the substrate into the gap.

In another aspect, the invention features a method of molding projections on a substrate. The method includes introducing a substrate, e.g., a linear substrate, having an outer surface into a gap formed between a peripheral surface of a rotating mold roll that defines a plurality of discrete cavities that extend inwardly from the peripheral surface, and a supporting surface. The resin is delivered to a nip formed between the outer surface of the substrate and the peripheral surface of the rotating mold roll. The outer surface of the substrate and the peripheral surface of the rotating mold roll are arranged to generate sufficient pressure to at least partially fill the cavities in the mold roll as the substrate is moved through the gap to mold an array to discrete projections including stems extending integrally from a layer of the resin bonded to the substrate. The molded projections are withdrawn from their respective cavities by separation of the peripheral surface of the mold roll from the outer surface of the substrate by continued rotation of the mold roll. The substrate has a beam stiffness sufficiently great that during withdrawal of the molded projections from their respective cavities, the substrate remains substantially linear.

In some embodiments, the beam stiffness of the substrate, measured as a product of an overall moment of inertia of a nominal transverse cross-section and an effective modulus of elasticity of material of the substrate, is greater than about 200 lb-in$^2$ (0.574 N-m$^2$).

In another aspect, the invention features an article having molded fastening projections. The article includes a substrate and an array of discrete molded projections including stems extending outwardly from and integrally with a molded layer of resin solidified about surface features of the substrate, and thereby securing the projections directly to the substrate. The substrate has a beam stiffness, measured as a product of an overall moment of inertia of a nominal transverse cross-section and an effective modulus of elasticity of a material from which the substrate is made, that is greater than about 200 lb-in$^2$ (0.574 N-m$^2$).

In some embodiments, the beam stiffness is greater than about 1,000 lb-in$^2$ (2.87 N-m$^2$), e.g., 4,000 lb-in$^2$ (11.48 N-m$^2$).

Embodiments may have one or more of the following advantages. Projections can be integrally molded onto substrates, e.g., substrates useful in construction, e.g., wallboard, window frames, panels, or tiles, without the need for using an adhesive, often reducing manufacturing costs, e.g., by reducing labor costs and increasing throughput. Integrally molding projections often improves adhesion of the molded projections to the substrate and reduces the likelihood of delamination of the molded projections from the substrate during the application of a force, e.g., a peeling force, or a shear force.

In situ lamination of hook, bands or islands on rigid materials held in a planar orientation or presenting a planar surface, extend in rigid flexible materials is also featured.

All publications, patent applications, patents, and other references mentioned herein are incorporated by reference herein to their entirety.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1:
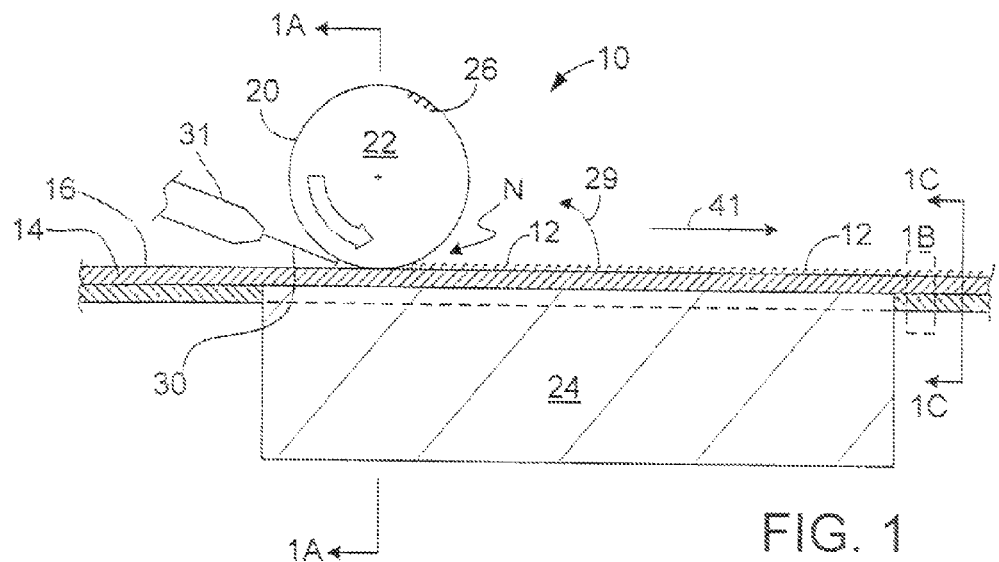
FIG. 1 is a side view of a process for molding hooks onto a T-shaped substrate, the process utilizing a fixed pressure platen as a supporting surface for the T-shaped substrate.
Figure 1A:
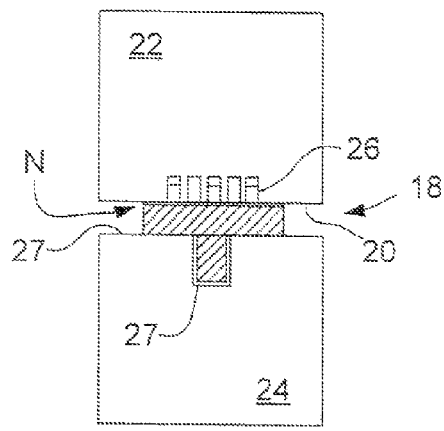
FIG. 1A is a cross-sectional view taken along 1A-1A of FIG. 1.
Figure 1B:
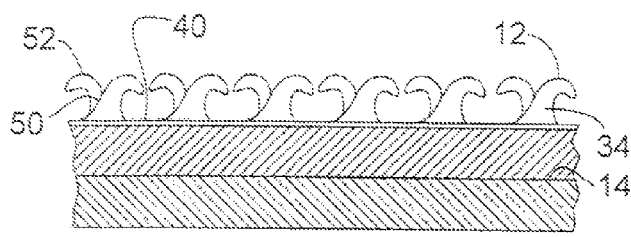
FIG. 1B is an enlarged side view of Area 1B of FIG. 1.
Figure 1C:
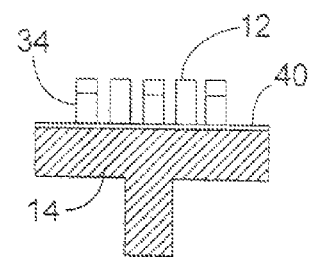
FIG. 1C is a cross-sectional view taken along 1C-1C of FIG. 1.

Rigid substrates having molded fastener projections, and methods of making the same are described herein. Generally, the substrates have a beam stiffness that is sufficiently great such that during withdrawal of the molded projections from their respective cavities, the substrate remains substantially straight, and does not bend away from its support.

Referring collectively to FIGS. 1 and 1A-1C, a process 10 for integrally molding projections, e.g., hooks 12, onto a substrate 14, e.g., a T-shaped substrate, includes introducing the substrate 14 that has an outer surface 16 into a gap 18 formed between a peripheral surface 20 of a rotating mold roll 22 and a fixed pressure platen 24 that has a supporting surface 27. The mold roll 22 defines a plurality of discrete cavities, e.g., cavities 26 in the shape of hooks, that extend inwardly from peripheral surface 20 of the rotating mold roll 22. An extruder (not shown) pumps resin 30, e.g., molten thermoplastic resin, through a die 31 where it is delivered to a nip N formed between outer surface 16 of the substrate and peripheral surface 20 of the rotating mold roll 22. The outer surface 16 of the substrate 14 and peripheral surface 20 of rotating mold roll 22 are arranged to generate sufficient pressure to fill the cavities in the mold roll 22 as substrate 14 is moved through gap 18 to integrally mold an array of discrete hooks 12, including stems 34, which extend outwardly from and are integral with a layer 40 that is bonded to outer surface 16. The molded hooks 12 are withdrawn from their respective cavities 26 by separation of the peripheral surface 20 of the mold roll 22 from outer surface 16 of substrate 14 by continued rotation of mold roll 22. Substrate 14 has a beam stiffness sufficiently great such that during withdrawal of hooks 12 from their respective cavities, the substrate 14 remains substantially linear, and is not bent away from the supporting surface 27 of fixed pressure platen 24 toward moll roll 22 (indicated by arrow 29). For example, substrate 14 has a beam stiffness, measured as a product of an overall moment of inertia of a nominal transverse cross-section and an effective modulus of elasticity (Young's modulus) of a material from which the substrate is formed, that is, e.g., greater than 1,000 lb-in$^2$ (2.87 N-m$^2$), e.g., 4,000 lb-in$^2$ (11.48 N-m$^2$) or greater, e.g., 8,000 lb-in² (22.96 N-m²). The effective modulus of elasticity of the material from which the substrate is formed is measured using ASTM E111-04 at 25° C. at fifty percent relative humidity, allowing sufficient time for moisture and temperature equilibration.

In some implementations, the outer surface 16 of substrate 14, the peripheral surface 20 of the rotating mold roll 22 and the resin 30 are arranged to generate sufficient friction such that the substrate 14 is pulled into and moved through gap 18, in a direction indicated by arrow 41, by continued rotation of mold roll 22.

In some embodiments, mold roll 22 includes a face-to-face assembly of thin, circular plates or rings (not shown) that are, e.g., about 0.003 inch to about 0.250 inch (0.0762 mm-6.35 mm) thick, some rings having cutouts in their periphery that define mold cavities, and other rings having solid circumstances, serving to close the open sides of the mold cavities and to serve as spacers, defining the spacing between adjacent projections. In some embodiments, adjacent rings are configured to mold hooks 12 such that alternate rows 50, 52 (FIG. 1B) have oppositely directed heads. A fully "built up" mold roll may have a width, e.g., from about 0.75 inch to about 24 inches (1.91 cm-61.0 cm) or more and may contain, e.g., from about 50 to 5000 or more individual rings. Further details regarding mold tooling are described by Fisher, U.S. Pat. No. 4,775,310, the disclosure of which is hereby incorporated by reference herein in its entirety.

Figure 2:
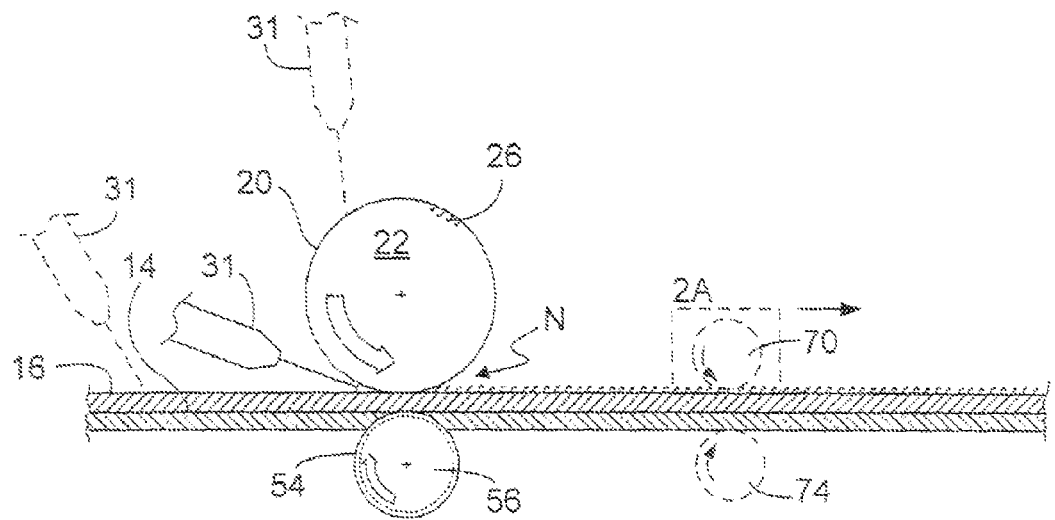
FIG. 2 is a side view of an alternative process for molding hooks onto a substrate, the process utilizing a counter-rotating pressure roll as support for the substrate.

Referring to FIG. 2, in an alternative embodiment, the supporting surface for substrate 14 is a peripheral surface 54 of a counter-rotating pressure roll 56. As discussed above, an extruder (not shown) pumps resin through die 31 and delivers the resin 30 to nip N to mold an array of discreet hooks 12 extending integrally from layer 40 that is bonded to the substrate. While an extruder (not shown) can pump resin 30 directly into the nip N, other points of delivery are possible. For example, as shown in FIG. 2, rather than delivering resin directly to nip N, extruder die 31 can be positioned to deliver resin 30 first to the outer surface 16 of substrate 14 upstream of the nip N. In this embodiment, resin 30 is transferred to nip N by moving substrate 14 through gap 18. This can be advantageous, e.g., when it is desirable that the resin 30 be somewhat set, e.g., cooled, prior to entering the nip N. In other embodiments, also as shown in FIG. 2, extruder die 31 is positioned to deliver resin 30 first to the outer surface 20 of the rotating mold roll 22. In this implementation, resin 30 is transferred to the nip N by rotating of the mold roll 22.

Figure 2A:
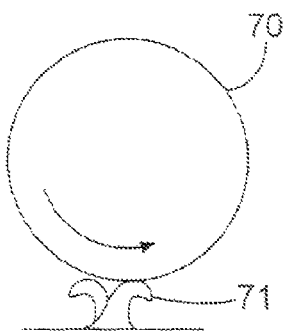
FIG. 2A is an enlarged side view of a reforming roll (Area 2A) of FIG. 2.

Referring particularly to FIG. 2A, in some instances, hooks 71 remain slightly deformed after being withdrawn from their respective cavities during separation of the peripheral surface 20 from the outer surface 16 of substrate 14. To return these hooks to their as-molded shape, the process shown in FIG. 2 can optionally include a reforming roll 70 that reforms deformed hooks 71 with pressure and, optionally, heat as the molded hooks move below the reforming roll 70. In some instances, it is desirable that the reforming roll 70 be rotated such that it has a tangential velocity that is higher than, e.g., ten percent higher or more, e.g., twenty-five percent higher, than the velocity of the substrate 14 to aid in the reforming of the deformed hooks. In some instances, reforming roll 70 can be used to maintain substrate 14 in a substantially linear state, by hindering movement of substrate 14 toward the mold roll.

In some embodiments, the process shown in FIG. 2 can optionally include a counter rotating nip-roller 74 in conjunction with the reforming roll 70 to aid in the moving of substrate 14 through gap 18.

Figure 3:
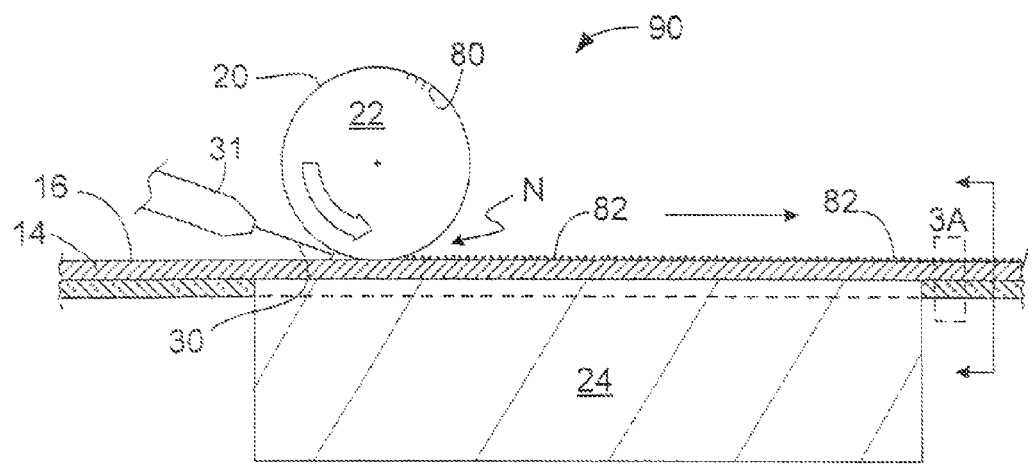
FIG. 3 is a side view of a process for molding stems onto a substrate.
Figure 3A:
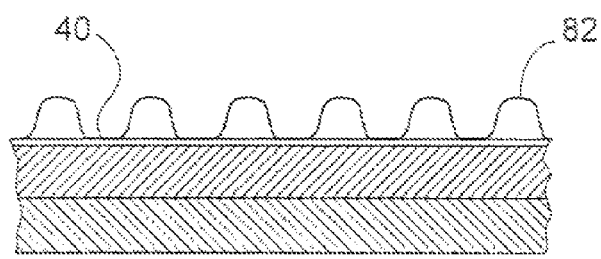
FIG. 3A is an enlarged side view of Area 3A of FIG. 3, showing a substrate having molded stems.

Referring now to FIGS. 3 and 3A, in an alternative embodiment, a process 90 for integrally molding projections in the shape of stems 82 onto substrates includes a mold roll 22 that defines a plurality of discrete cavities 80 in the shape of stems 82 that extend inwardly from a peripheral surface 20 of the rotating mold roll 22. In some instances, removal of molded projections that are in the shape of stems 82 from a mold roll can be easier (relative to projections in the shape of hooks) because the mold roll does not have cavities that have substantial undercuts. As a result, substrate 14 can often have a lower beam stiffness (relative to embodiments of FIGS. 1 and 2) and still remain substantially linear during withdrawal of the stems 82 from their respective cavities 80. For example, the substrate can have a beam stiffness that is, e.g., greater than 200 lb-in² (0.574 N-m²), e.g., 1,000 lb-in² (2.87 N-m²).

Figure 4:
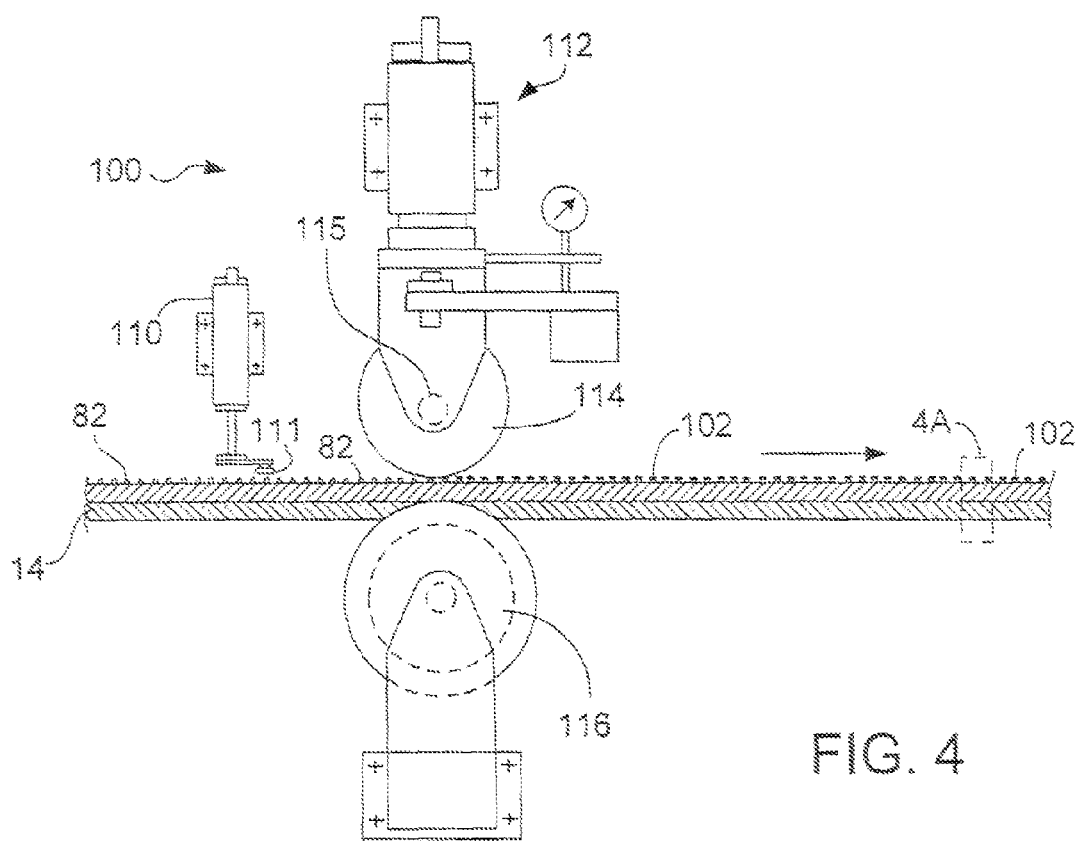
FIG. 4 is a side view of a process for reforming the molded stems of FIG. 3 to form engageable projections shaped to be engageable with loops (FIG. 4B) or other projections.
Figure 4A:
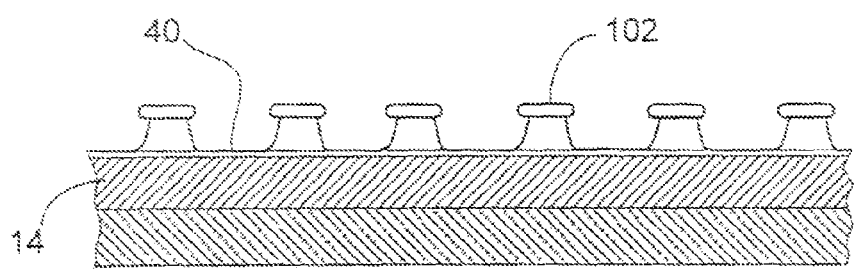
FIG. 4A is an enlarged side view of Area 4A of FIG. 4.
Figure 4B:
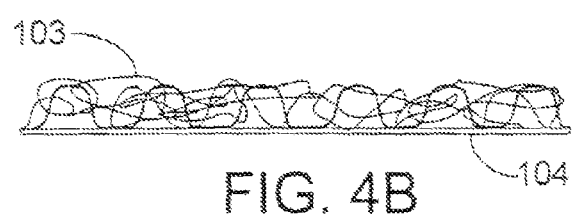
FIG. 4B is an enlarged cross-sectional view of a substrate carrying fibrous loops.
Figure 4C:
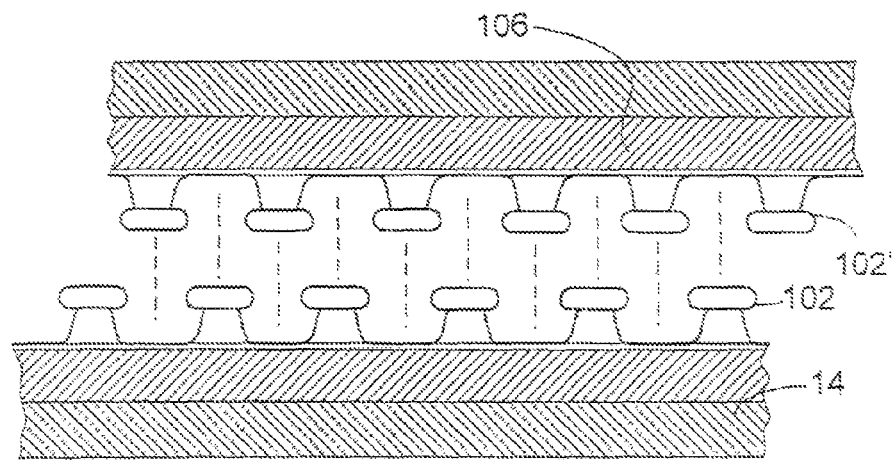
FIG. 4C is a side view of two substrates having deformed molded stems, illustrating how the two substrates can engage each other.

Referring to FIGS. 4-4C, the projections in the shape of stems 82 that were integrally molded to substrate 14 by the process shown in FIG. 3 can be deformed (such as when a thermoformable resin is employed to mold the stems) by a deforming process 100. Process 100 can form engaging heads 102 shaped to be engageable with loops 103 that extend from a base 104 of a mating material (FIG. 4B), or that are engageable with other projections 102' of a mating substrate 106 (FIG. 4C).

Referring particularly to FIG. 4, a heating device 110 includes a heat source 111, e.g., a non-contact heat source, e.g., a flame, an electrically heated wire, or radiant heat blocks, that is capable of quickly elevating the temperature of material that is close to heat source 111, without significantly raising the temperature of material that is further away from heat source 111. After heating the stems 82, the substrate moves to conformation station 112, passing between conformation roll 114 and drive roll 116. Conformation roll 114 deforms stems 82 to form engageable heads 102, while drive roll 116 helps to advance the substrate.

It is often desirable to chill the conformation roll, e.g., by running cold water through a channel 115 in the center of roll 114, to counteract heating of conformation roll 114 by the heat of the resin. Process 100 can be performed in line with the process shown in FIG. 3, or it can be performed as a separate process. Further details regarding this deforming process are described by Clarner, U.S. patent application Ser. No. 10/890,010, filed Jul. 13, 2004, the entire contents of which are incorporated by reference herein.

Figure 5:
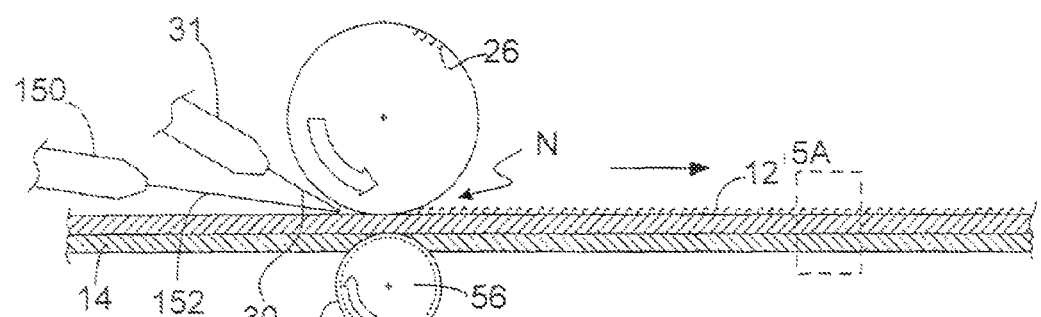
FIG. 5 is a side view of a process for molding hooks onto a substrate that utilizes a tie layer.
Figure 5A:
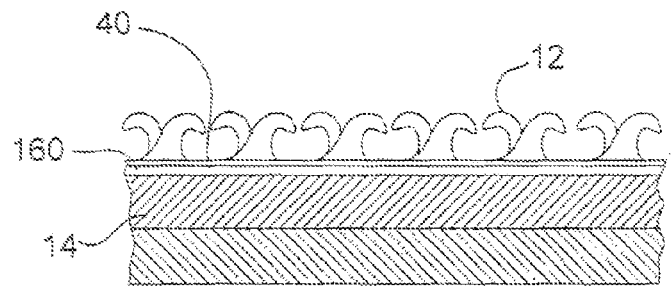
FIG. 5A is an enlarged side view of Area 5A of FIG. 5.

Referring now to FIGS. 5 and 5A, in an alternative embodiment, as extruder (not shown) pumps resin 30 through die 31, and delivers resin 30 to nip N formed between outer surface 16 of substrate 14 and peripheral surface 20 of rotating mold roll 22. At the same time, a second extruder (not shown) pumps another resin 152 through another die 150, and delivers the other resin to the nip N such that the other resin 152 is disposed underneath the resin 30, becoming bonded to the other surface 16 of substrate 14 (formed layer 160, e.g., a tie layer), while the resin 30 becomes bonded to an outer surface of the other resin 152. This is often advantageous, e.g., when adhesion of resin 30 to surface 16 is poor. In some embodiments, a maleated polypropylene, or a blend of maleated polypropylene and polypropylene is used a other resin 152, and polypropylene is used as resin 30.

In any of the above embodiments, suitable materials for forming projections e.g., hooks 12 or stems 82, are resins, e.g., thermoplastic resins, that provide the mechanical properties that are desired for a particular application. Suitable thermoplastic resins include polypropylene, polyethylene, acrylonitrile-butadiene-styrene copolymer (ABS), polyamide, e.g., nylon 6 or nylon 66, polyesters, e.g., polyethylene terephthalate (PET) or polybutylene terephthalate (PBT), and blends of these materials. The resin may include additives, e.g., lubricating agents, e.g., silicones or fluoropolymers, solid fillers, e.g., inorganic fillers, e.g., silica or pigments, e.g., titanium dioxide. In some embodiments, lubricating agents are employed to reduce the force required to remove molded hooks from their respective cavities. In some embodiments, an additive is used to improve adhesion of the resin 30 to substrate 14, e.g., an anyhydride-modified linear low-density polyethylene, e.g., Plexar® PX114 available from Quantum.

In any of the above embodiments, the overall moment of inertia of the nominal transverse cross-section of the substrate can be greater than 0.00020 in$^4$ (0.00832 cm$^4$). Examples of substrate inertial moments include 0.00065 in$^4$ (0.0271 cm$^4$), 0.0050 in$^4$ (0.208 cm$^4$), 0.040 in$^4$ (1.67 cm$^4$) and 0.5 in$^4$ (20.8 cm$^4$).

In any of the above embodiments, the effective modulus of elasticity of the material from which the substrate can be greater than 100,000 psi (6.89×10$^8$ N/m$^2$), e.g., 250,000 psi (1.72×10$^9$ N/m$^2$), 750,000 psi (5.17×10$^9$ N/m$^2$), 1,000,000 psi (6.89×10$^9$ N/m$^2$) or more, e.g., 5,000,000 psi (3.45×10$^{10}$ N/m$^2$), 15,000,000 psi (1.03×10$^{11}$ N/m$^2$) or more, e.g., 30,000,000 psi (2.07×10$^{11}$ N/m$^2$). The effective modulus of elasticity of the material from which the substrate is formed is measured using ASTM E111-04 at 25° C. at fifty percent relative humidity, allowing sufficient time for moisture and temperature equilibration.

In any of the above embodiments, the substrate can be, e.g., a construction material, such as wallboard, window frame, wall panel, floor tile, or ceiling tile.

In any of the above embodiments, in order to improve adhesion of resin to the substrate, it is often advantageous to mold onto a substrate with an average surface roughness of greater than 1 micron, e.g., 2, 3, 4, 5 micron or more, e.g., 10 micron, as measured using ISO 4288:1996(E).

In any of the above embodiments, the projections, e.g., hooks 12 or stems 82, preferably have a density of greater than 300 projections/in$^2$ (46.5 projections/cm$^2$), e.g., 500 (77.5 projections/cm$^2$), 1,000 (155.0 projections/cm$^2$), 2000 (310.0 projections/cm$^2$) or more, e.g., 3,500 projections/in$^2$ (542.5 projections/cm$^2$).

In any of the above embodiments, the substrate can be pre-heated prior to introducing substrate 14 into the gap 18. Pre-heating is sometimes advantageously used to improve adhesion of the resin 30 (or other resin 152) to substrate 14. It can also be used, when a thermoplastic resin is employed, to prevent over cooling of the thermoplastic resin before entering the nip N.

In any of the above embodiments, substrate 14 can be primed, e.g., to improve the adhesion of resin 30 (or 152) to substrate 14. In some embodiments, the priming is performed just prior to introducing of substrate 14 into the gap 18. Suitable primers include acetone, isobutane, isopropyl alcohol, 2-mercaptobenziothiazole, N,N-dialkanol toluidine, and mixtures of these materials. Commercial primers are available from Loctite® Corporation, e.g., Loctite® T7471 primer.

While certain embodiments have been described, other embodiments are envision.

While various locations of an extruder head are specifically shown in FIG. 2, these locations can be applied to any of the embodiments described above.

As another example, while embodiments have been described in which substrates are formed from a single material, in other embodiments, substrates are formed from multiple materials. For example, the substrates can be formed of wood, metal, e.g., steel, brass, aluminum, aluminum alloys, or iron, plastic, e.g., polyimide, polysulfone, or composites, e.g., composites of fiber and resin, e.g., fiberglass and resin.

Figure 6:
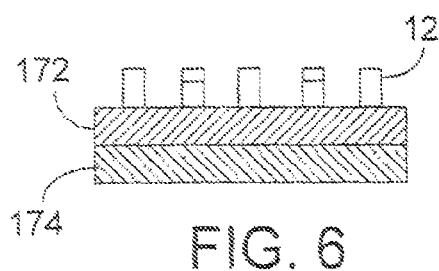
FIGS. 6 and 7 are cross-sectional views of planar, laminated substrates, having two and three layers, respectively.
Figure 7:
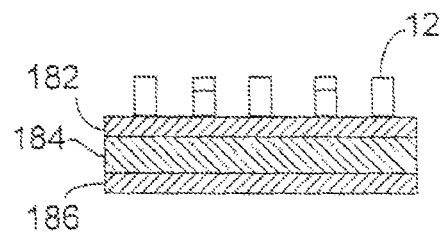

As an additional example, while embodiments have been described in which the base of the fastener is formed of a single layer, in other embodiments, such bases are formed of more than a single layer of material. Referring to FIGS. 6 and 7, a fastener base bonded to a rigid substrate may be formed of two layers 172 and 174 (FIG. 6), and each layer can be a different kind of resin. In still other embodiments, a substrate may be formed of three layers 182, 184 and 186 (FIG. 7). More than three layers are possible.

Figure 8A:
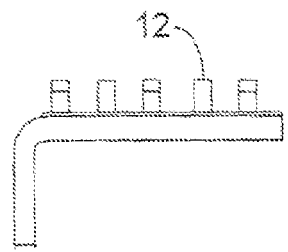
FIG. 8 is a cross-sectional view of an L-shaped substrate having hooks in which heads are directed in a single direction.
FIG. 8B is a perspective view of the L-shaped substrate of FIG. 8A.
Figure 9:
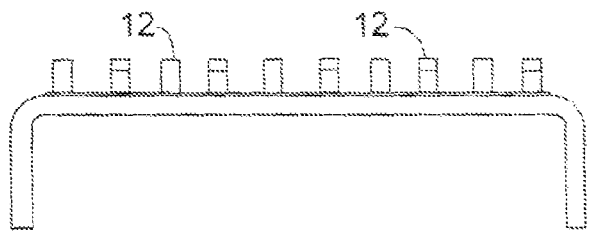
FIG. 9 is cross-sectional view a U-shaped substrate having molded projections.
Figure 8B:
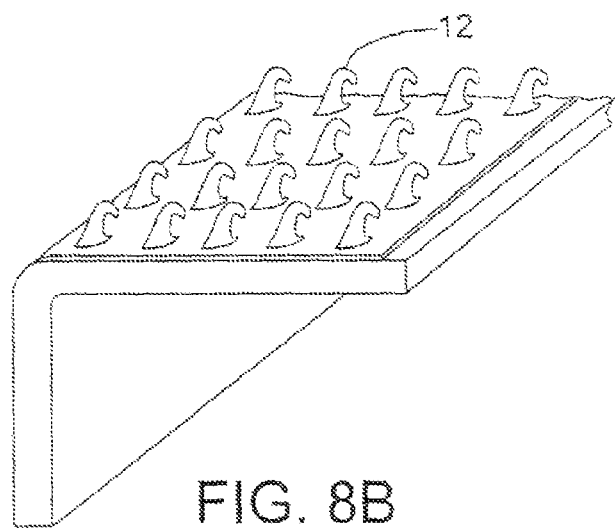

As a further example, while substrates have been described that are T-shaped and planar in transverse cross-section, other transverse shapes are possible. Referring to FIGS. 8A and 8B, an L-shaped substrate having hooks in which heads are directed in a single direction is shown. Still other shapes are possible. For example, FIG. 9 shows a U-shaped substrate.

While the embodiments of FIGS. 1-3 show resin being continuously delivered to nip N, in some instances it is desirable to deliver discrete doses or charges of resin to the substrate, e.g., to reduce resin costs, so that projections are arranged on only discrete areas of the substrate. This can be done, e.g., by delivering the doses or charges through an orifice defined in an outer surface of a rotating die wheel, as described in "Delivering Resin For Forming Fastener Products," filed Mar. 18, 2004 and assigned U.S. Ser. No. 10/803,682, the entire contents of which are incorporated by reference herein.

While projections 82 of FIG. 3A are shown to have radiused terminal ends, in some embodiments, projections have non-radiused, e.g., castellated terminal ends, such as some of the projections described in "HOOK AND LOOP FASTENER," U.S. Ser. No. 10/455,240, filed Jun. 4, 2003, the entire contents of which are incorporated by reference herein.

Figure 10:
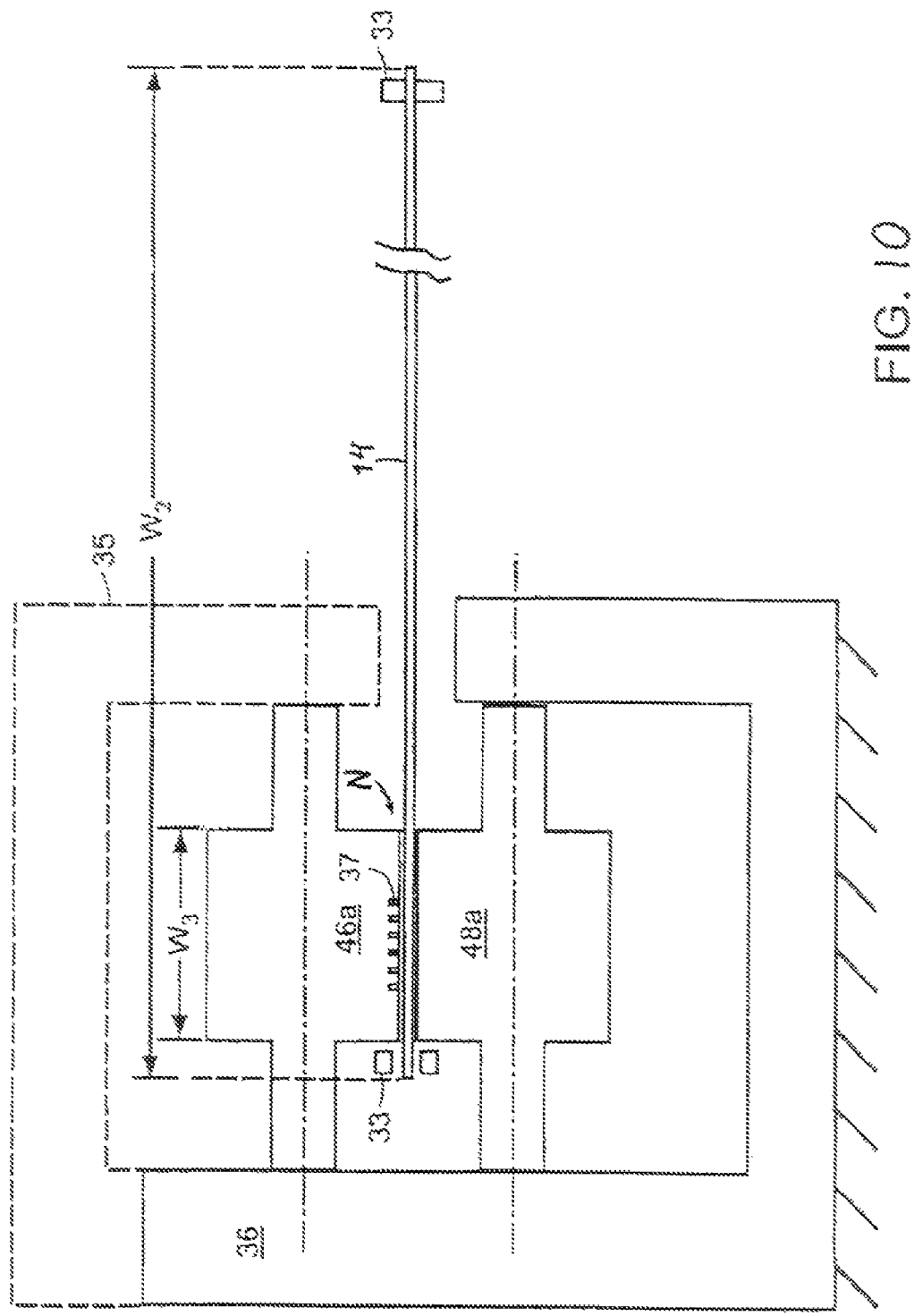
FIG. 10 is a front view of a fastener element molding apparatus of the present invention applying fastener elements to a planar sheet or work piece.
Figure 11:
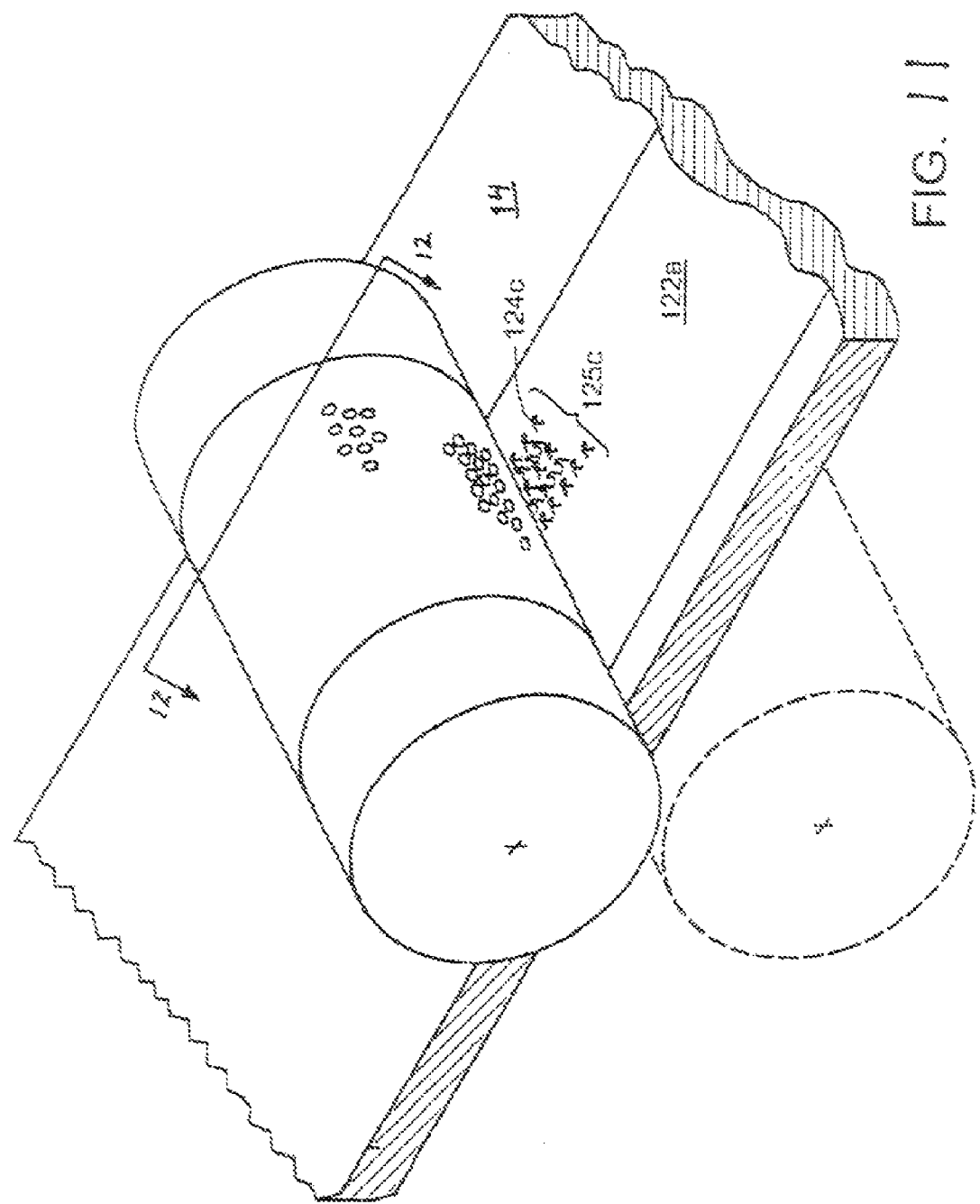
FIG. 11 is an isometric view of the apparatus of FIG. 10 illustrating only the fastener element mold roll portion of the apparatus applying engageable fastener elements to a sheet or work piece.
Figure 12:
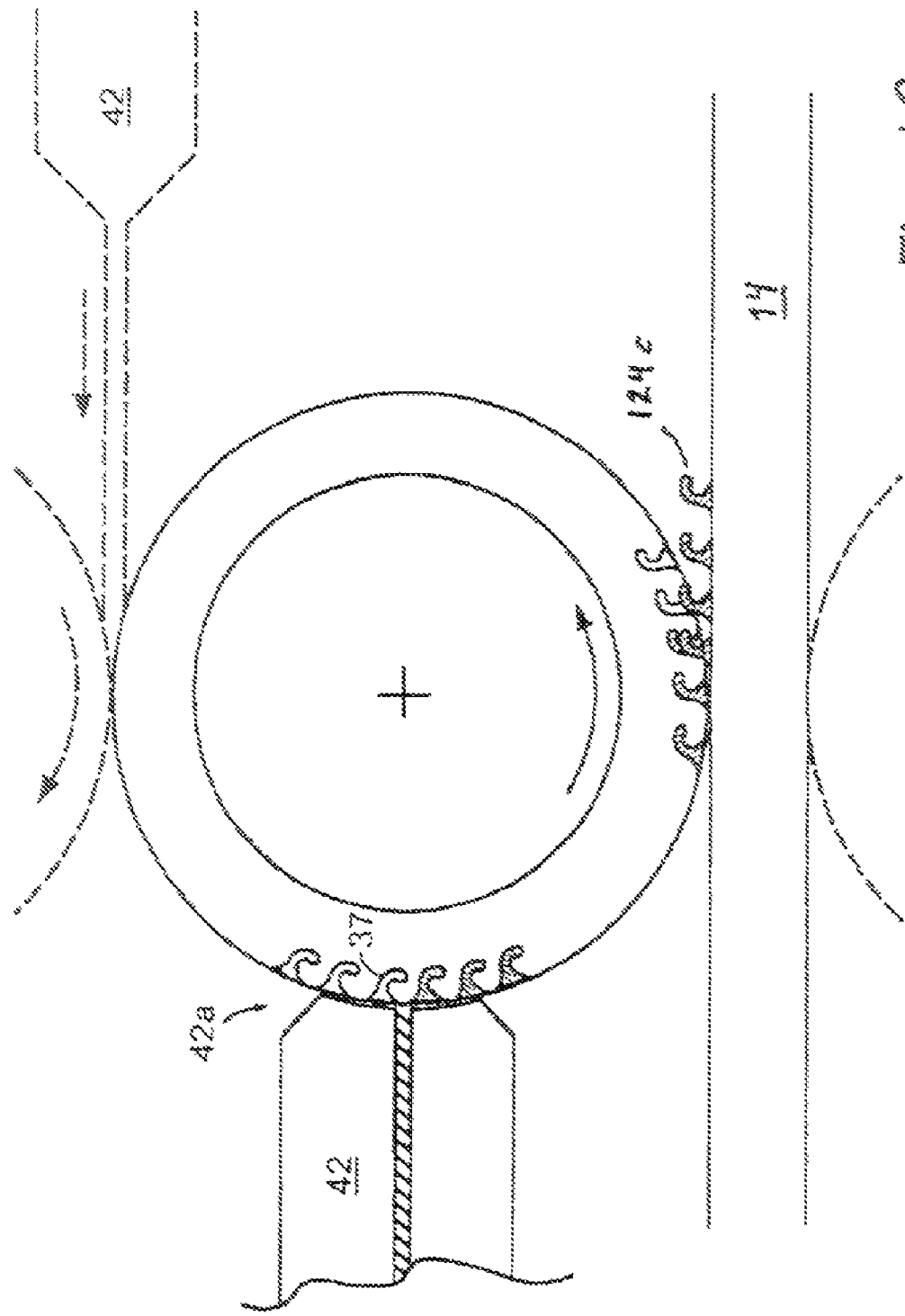
FIG. 12 is a cross-sectional view of the mold roll in FIG. 11 taken along line 12-12 of FIG. 11.

Referring to FIGS. 10, 11 and 12 substrate 14 is of planar form as it proceeds through the mold station. As shown in FIG. 10, a cantilever-mounted mold roll 46a extends inwardly form the edge of substrate 14 or the work piece to the position where a band or bands of molded fastener stems or fully formed molded fastener hooks, are desired.

Where the band or bands of fastener stems or fully formed hooks are to be applied near the edge of substrate 14, the required nip forces are sufficiently low that rolls 46a and 48a may be supported from one end using suitably spaced bearings of a cantilever mounting. That arrangement is suggested in the solid line diagram of the mounting of mold roll 46a in FIG. 10. Where the nip pressure is greater, a cantilever support 35 for a second bearing is employed, as suggested in dashed lines in the figure.

Referring to FIGS. 10 and 11, the operation of a molding apparatus is illustrated with substrate 14 being fed through nip N formed by mold roll 46a and pressure roll 48a. Mold roll 46a extends from frame 36 in a cantilevered fashion, e.g., supported from one side only, so that substrate 14 of width, W$_2$, greater than the width, W$_3$, of mold roll 46a can be processed through nip N without interfering with frame 36. Typically mold roll 46 has width W$_3$ of less than approximately 2 ft. The cantilevered support of one of the rolls leaves an open end of nip N to allow workpieces of substantially greater than either roll 46a or 48a to pass through nip N without interfering with support frame 36. As substrate 14 moves through nip N, cavities 37 of mold roll 46a are filled, as described below, with molten thermoplastic resin, e.g., polypropylene, to form engageable elements, e.g., hooks which are deposited in a relatively narrow band onto a portion of substrate 14. The initially molten thermoplastic resin adheres the base of each hook stem to substrate 14 as the thermoplastic resin solidifies, in an in situ bonding action.

The amount of molten thermoplastic resin delivered to the mold roll determines whether the hooks will form an integral array of thermoplastic resin joined together by a thin base layer which is adhered to the surface of the preformed carrier sheet or substrate 14 or whether the hooks will be separate from one anther, individually adhered to the carrier. For example, as shown in FIG. 4A, a thin layer of thermoplastic resin forms the base layer 40, which is integral with the array of fastener projections extending therefrom.

However, by reducing the amount of thermoplastic resin delivered to the mold roll, joining base layer 122a can be eliminated so that the base of each molded fastener stem is in situ bounded substrate 14 without thermoplastic resin joining hooks 124c together.

Referring now to FIG. 12, an example of delivery of molten thermoplastic resin to the mold roll 46a to form fastener elements 124c on substrate 14 will be described. Molten thermoplastic resin is delivered to mold roll 46a by extruder 42. Delivery head 42a of extruder 42 is shaped to conform with a portion of the periphery of mold roll 46a to form base layer 122a and to prevent extruded thermoplastic resin from escaping as it is forced into hook cavities 37 of rotating (counterclockwise) mold roll 46a. Rotation of mold roll 46a brings base portions of thermoplastic resin-filled cavities 37 into contact with substrate 14 and the thermoplastic resin is forced (by pressure roll 48a (FIG. 10)) to bond to the surface of substrate 14. In the case of porous or fibrous substrates, carrier sheets or workpieces, the thermoplastic resin solidifies, portions which have partially penetrated the surface adhere to substrate 14 with further rotation of mold roll 46a partially solidified molded hooks 124c or stems are extracted from mold cavities 37 leaving a band of hooks or stems projecting from substrate 14. By adjusting the space between head 42a and mold 46, the volume of molten thermoplastic resin delivered, and the speed rotation of mold roll 46a, an amount of thermoplastic resin beyond the capacity of mold cavities 37 can be delivered to mold roll 46a. This additional thermoplastic resin resides on the periphery of mold roll 46a and is brought into contact with substrate 14 to form base layer 122a of thermoplastic resin from which the stems of the engaging elements 124c extend. In dashed lines, an alternative method of delivering the molten resin to the mold roll, as described previously above, is also suggested.

It will be realized that the apparatus of FIGS. 10-12 do not require that substrate 14 be flexible. It may indeed be a rigid workpiece, for instances it may be a construction material such as performed building siding, roofing material, or a structural member, fed through the molding station on appropriate conveyors. The apparatus of all of the embodiments may be incorporated in a manufacturing line, in which the substrate, carrier or workpiece is a perform, upon which further actions are taken other than in situ bonding of fasteners or fastener stems occurs. The manufacturing line may be, e.g., for manufacture of building siding, roof shingles or packaging sheet or film.

There are other ways to form e.g. separated parallel linear bands or discrete, disconnected islands of hooks on the above-described substrates within certain broad aspects of the present invention. For example, at dispersed, selected locations across the width of a traveling preformed substrate, e.g. a material defining hook-engageable loops, discrete separate molten resin deposits of the desired form, e.g. of x, y-isolated islands, or in spaced apart parallel bands, may be deposited upon the surface structure of the substrate. Following this, upper portions of the resin deposits, while still molten, or after being reheated by an intense localized flame line, are molded into fastener stems by mold cavities that are pressed against the resin deposits. For instance, at selected widthwise separated locations along a deposit line, as the substrate transits the line, discrete island-form deposits are made at selected locations. Immediately, with the resin still molten, or after heat activation, the substrate is introduced into a molding nip, formed by a mold roll and a pressure roll. The mold roll, for instance, defines tiny fixed hook fastener cavities as described above, or smaller fastener features, e.g. of less than 0.005 inch height, or similarly shallow cavities for tiny stem preforms, that are aligned to press down upon the resin deposits under conditions in which nip pressure causes the molten resin to enter the cavities at the base of the stem portion of the cavities, and fill the molds, and be molded into a localized dense array of stem preforms or into a localized dense array of fully formed loop-engageable molded hooks. With appropriate amounts of resin in the deposits, a base layer common to all of the molded sterns of a discrete island deposit can be formed by the mold roll surface, as may be desired. The mold pressure, simultaneously with the molding, causes the resin to bond firmly to the surface structure of the preformed carrier, effecting in situ lamination. Where the preformed substrate has a fibrous or porous makeup, as with hook-engageable loop material, the nip pressure causes the resin to comingle with the top fibers or other structure that define the surface structure of the substrate, without penetrating the full depth of the substrate. Thus the opposite side of the substrate can remain pristine, free of the molding resin, and, if the opposite surface of the preformed web defines a uniform surface of hook-engageable loops across the full width of the article, the effectiveness of those loops can be preserved while the molded stems or fully molded hooks are molded and in situ bonding occurs.

With such arrangements it will be understood that the regions of the substrate between the separated islands remain free of the resin from which the hooks or stem preforms are molded. Thus, in the case of elastically stretchy substrate webs or carrier sheet preforms, whether of plain preformed elastomer sheet, or a stretchy hook-engageable loop material, the resin-free regions enable the web to be elastically stretchy, while flexibility of the article in both orthogonal (X, Y) directions in the plane of the web is achieved. Where the preformed carrier web is a non-stretchy, but flexible material, such as a bi-directionally stabilized knit loop product having hook-engageable loops on both sides, the regions between the separated islands enable the finished article to be simply flexible in both X and Y directions in the plane of the fabric.

In certain embodiments, rather than locating discrete regions of hook cavities on the mold roll, in positions to register with a pre-arranged pattern of resin deposits, the mold roll may simply have an array of mold cavities entirely occupying the mold surface of the roll, or may have such mold cavities in narrow bands separated by enlarged spacer rings or cross-wise extending ridges, as described above.

Still other embodiments are within the scope of the claims that follow.

What is claimed is:

1. A method of forming fastening projections on a rigid substrate, the method comprising:
    delivering a resin to an outer surface of a rigid substrate;
    molding from the resin an array of discrete stems in cavities defined in a peripheral surface of a mold roll rolled over the surface of the substrate, the stems withdrawing from their cavities by continuous rotation of the mold roll while the substrate remains rigid, leaving the stems projecting from the surface of the substrate;
    bonding the resin to the outer surface of the substrate; and
    forming fastening heads at distal ends of the stems, wherein the substrate comprises one or more members selected from the group consisting of a wallboard, a window frame, a wall panel, a floor tile, and a ceiling tile.

2. The method of claim 1, wherein the molding and bonding comprise generating sufficient pressure between the substrate and the mold roll to at least partially fill the cavities in the mold roll with the resin while bonding the resin to the substrate.

3. The method of claim 2, wherein the discrete projecting stems are molded to extend integrally from a common layer of the resin bonded to the substrate.

4. The method of claim 2, wherein the resin penetrates the surface of the substrate through pores or fiber interstices in the surface of the substrate.

5. The method of claim 1, wherein the resin is delivered and the array bonded so as to form a discrete band or island of projections on the substrate.

6. The method of claim 1, wherein the cavities are shaped to form the fastening heads on the stems as the stems are molded, the fastening heads deforming as they are withdrawn from the cavities.

7. The method of claim 1, wherein the resin is delivered to the substrate by the mold roll.

8. The method of claim 1, comprising introducing the substrate to a gap defined between the mold roll and a counter-rotating pressure roll.

9. The method of claim 8, wherein the pressure roll or the mold roll defines a groove to accommodate a shape of the substrate.

10. The method of claim 8, wherein the mold roll and pressure roll are interconnected on one side of the gap, with an opposite side of the gap open for accommodating wide substrates, the method forming fastener projections along an edge region of the substrate while an opposite edge of the substrate extends beyond the mold roll.

11. The method of claim 1, comprising selecting whether the discrete projections are bonded directly to the surface of the substrate or whether the discrete projections extend integrally from a layer of resin bonded to the surface of the substrate and then choosing an amount of resin to be delivered in consideration of such selection.

12. The method of claim 1, wherein the substrate comprises rigid building material.

13. The method of claim 1, further comprising heating the resin between delivering the resin and one of the molding and bonding steps.

14. The method of claim 1, where the resin is delivered into a nip formed between the mold roll and the substrate.

15. The method of claim 1, wherein a pre-arranged pattern of resin is delivered to be aligned with a pre-arranged pattern of cavities in the mold roll.

16. The method of claim 1, wherein the resin is delivered to form separated array bands of projections and the resin is molded into the separated array bands by a continuous pattern of cavities in the mold roll.

17. The method of claim 1, wherein the discrete projections are molded in the form of hooks.

18. The method of claim 1, wherein the resin is delivered directly into the cavities in the mold roll and the resin is then bonded to the substrate.

19. The method of claim 18, comprising delivering additional resin to the peripheral surface of the mold roll to form a base layer, such that the discrete projections extend integrally from the base layer of resin which is bonded to the substrate.

20. The method of claim 18 wherein the discrete projections are individually bonded to the surface of the substrate without any additional resin bonded between the projections to the surface of the substrate.

21. The method of claim 1, wherein the resin is delivered to the substrate before filling the cavities of the mold roll.

22. The method of claim 1, wherein the molding and bonding occur simultaneously in response to pressure between the mold roll and the substrate surface.

23. The method of claim 1, wherein the substrate has a beam stiffness, measured as a product of an overall moment of inertia of a nominal cross-section of the substrate and an effective modulus of elasticity of a material from which the substrate is formed, that is greater than about 200 lb-in$^2$.

24. The method of claim 23, wherein the beam stiffness is greater than 1,000 lb-in$^2$.

25. The method of claim 1, wherein the method comprises passing the substrate through a nip defined between the mold roll and a pressure roll and introducing the resin into the nip, wherein a portion of the substrate extends laterally beyond the mold roll when the substrate is passed through the nip.

26. The method of claim 25, wherein the mold roll has first and second end portions and the pressure roll has third and fourth end portions, the first and second end portions of the mold roll and the third and fourth end portions of the pressure roll are rotatably coupled to a frame, and the frame forms a slot through which the substrate extends when the substrate is passed through the nip such that a portion of the substrate extends laterally beyond the frame and the mold and pressure rolls as the substrate passes through the nip.

27. The method of claim 25, wherein the mold roll has a first end portion rotatably attached to a frame and second end portion detached from the frame in a cantilevered arrangement, and the cantilevered arrangement of the first cylindrical roll allows the substrate to extend laterally beyond the frame and the mold roll as the substrate passes through the nip.

28. A method of forming fastening projections on a rigid substrate, the method comprising:
    delivering a resin to an outer surface of a rigid substrate;
    molding from the resin an array of discrete stems in cavities defined in a peripheral surface of a mold roll rolled over the surface of the substrate, the stems withdrawing from their cavities by continuous rotation of the mold roll while the substrate remains rigid, leaving the stems projecting from the surface of the substrate;
    bonding the resin to the outer surface of the substrate; and
    forming fastening heads at distal ends of the stems,
    wherein the resin is delivered directly into the cavities in the mold roll and the resin is then bonded to the substrate, and wherein the discrete projections are individually bonded to the surface of the substrate without any additional resin bonded between the projections to the surface of the substrate.

* * * * *

UNITED STATES PATENT AND TRADEMARK OFFICE
CERTIFICATE OF CORRECTION

PATENT NO. : 7,794,559 B2  Page 1 of 1
APPLICATION NO. : 11/748427
DATED : September 14, 2010
INVENTOR(S) : Shawn C. Banker et al.

It is certified that error appears in the above-identified patent and that said Letters Patent is hereby corrected as shown below:

On the title page item (75), Inventor Ernesto S. Tachauer:
delete "Center, IA" and replace with --Clinton, IA--.

Claim 20, column 12, line 6:
delete "claim 18" and replace with --claim 18,--.

Signed and Sealed this
Fourth Day of January, 2011

David J. Kappos
*Director of the United States Patent and Trademark Office*